Figure 1:
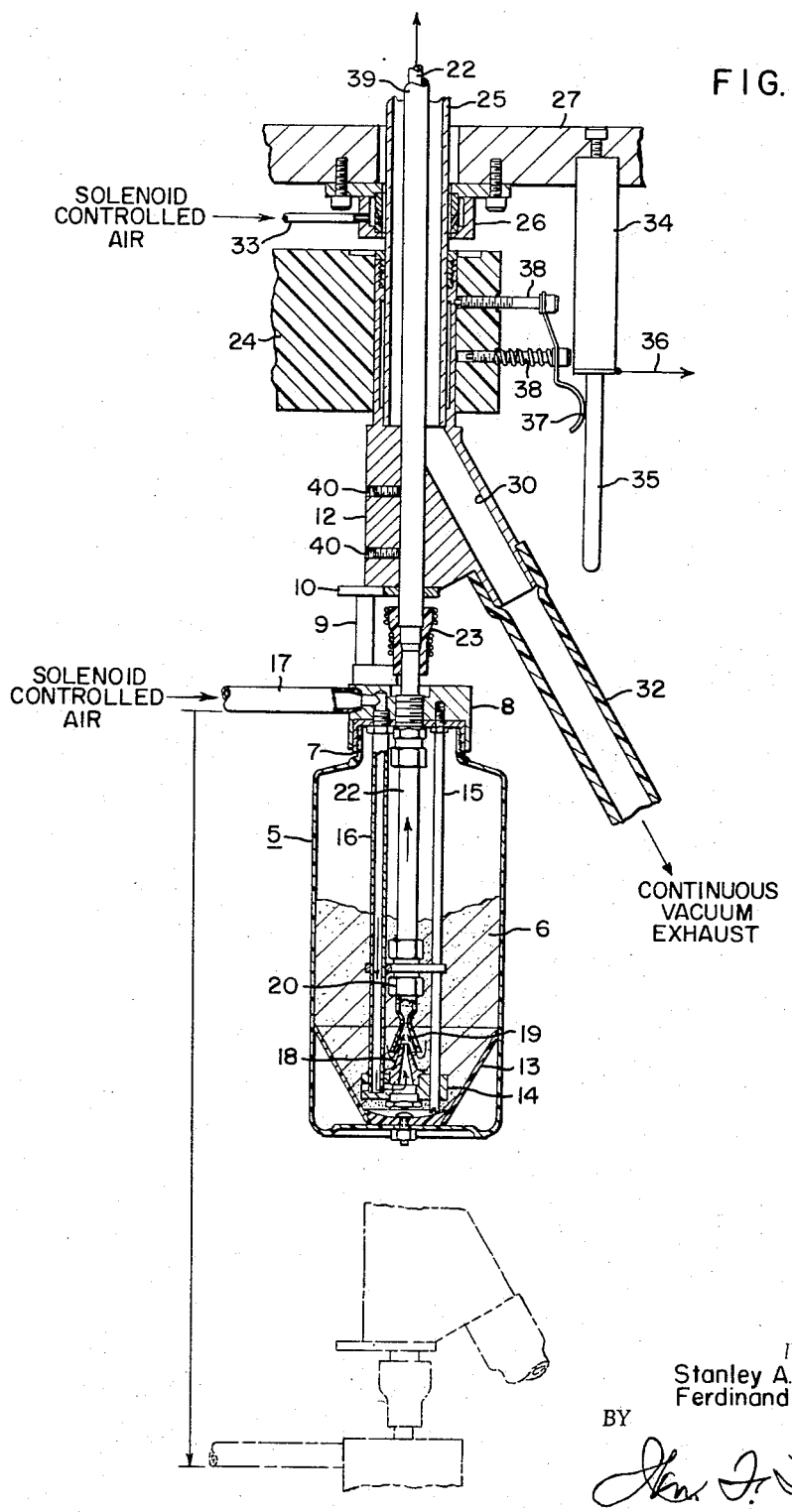

INVENTORS
Stanley A. Lopenski and
Ferdinand Rokosz

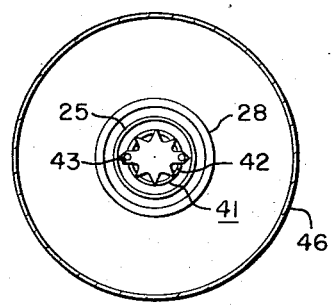
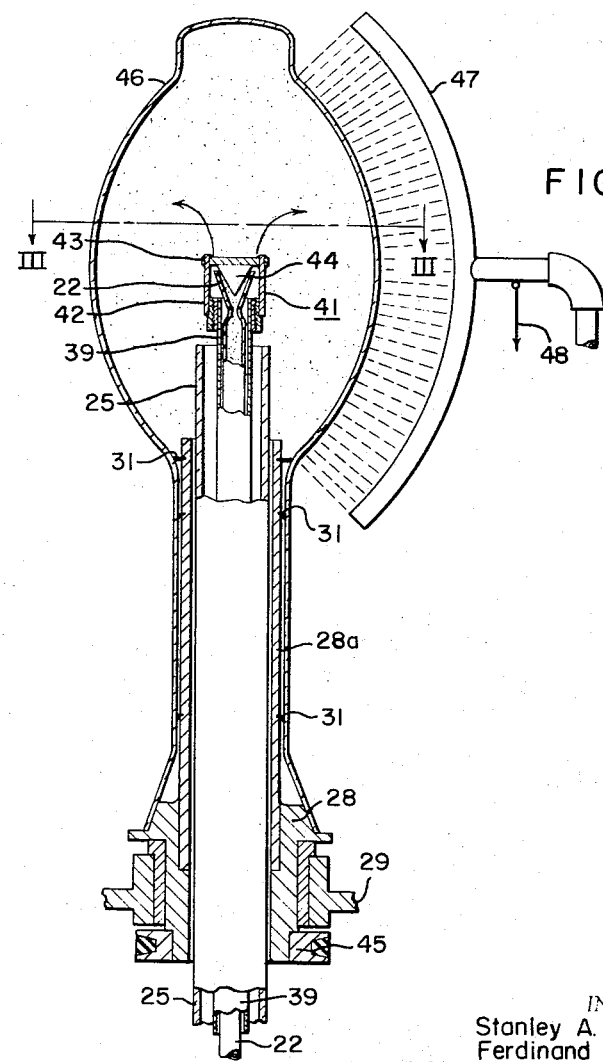

INVENTORS
Stanley A. Lopenski and
Ferdinand Rokosz
BY ved Dec. 19, 1967

3,358,639
ELECTROSTATIC COATING APPARATUS FOR UNIFORMLY APPLYING PHOSPHOR POWDERS

Stanley A. Lopenski, Pompton Plains, and Ferdinand Rokosz, Clifton, N.J., assignors to Westinghouse Electric Corporation, Pittsburgh, Pa., a corporation of Pennsylvania
Filed Oct. 1, 1965, Ser. No. 492,089
5 Claims. (Cl. 118—49.5)

The present invention relates to electrostatic coating apparatus and, more particularly, to such apparatus for the suspenison of phosphor powders in a gaseous medium such as air and the application thereof to the surface of an envelope for an electric lamp to obtain maximum fluorescense.

Electrostatic coating apparatus is now well known in the art of manufacturing electric lamps but has been more or less confined to the electrostatic coating of the interior surface of an incandescent electric lamp with silica or similar light-scattering material and wherein the components of the apparatus have been fabricated of metal and plastic. These previous types of apparatus have been inherently subject to the objections that the phosphor powder is too frequently contaminated due to the abrasive action thereof on the metal and plastic components of the apparatus. Also the recirculation of the phosphor powder in its air suspension has resulted in particle size separation with only fine particle sizes actually being dispersed into the envelopes for coating.

It is accordingly the primary object of the present invention to provide an electrostatic coating apparatus wherein separation and fractionation of the phosphor particles is inhibited and the possibility of contamination of such phosphor is reduced to a minimum.

Another object of the present invention is the provision of an electrostatic coating apparatus for applying a coating of phosphor to the inside surface of a lamp envelope wherein a uniform phosphor layer having improved powder adhesion results.

The foregoing objects of the present invention, together with other objects which will become apparent from the following description, are accomplished by providing a reservoir for the phosphor powder in the form of a readily removable plastic container. A nozzle support assembly of highly polished non-abrading metal is suspended in such reservoir within which a quartz venturi tube is aligned and through which the air-suspended phosphor powder is directed to a coating probe nozzle. Such coating probe nozzle is reciprocally movable into and out of the lamp envelope to be coated and at its upper end is provided with a multiple probe tip also of highly polished non-abrading metal. The underside of this multiple probe tip has a quartz target cone affixed thereto for uniformly dispersing the air-suspended phosphor radially within the surrounding envelope. This dispersed phosphor thus passes through the electrostatic field created between the multiple probe tip and the wall of the surrounding envelope and attains a uniform charging of particles thereby producing a greater affinity to adhere to the envelope surface. Moreover, by the utilization of the quartz components which are contacted by the air-accelerated phosphor powder, metallic contamination of the final coating is eliminated and particle size separation is precluded by complete utilization of the phosphor powder aspirated into the quartz venturi tube.

Figure 4:
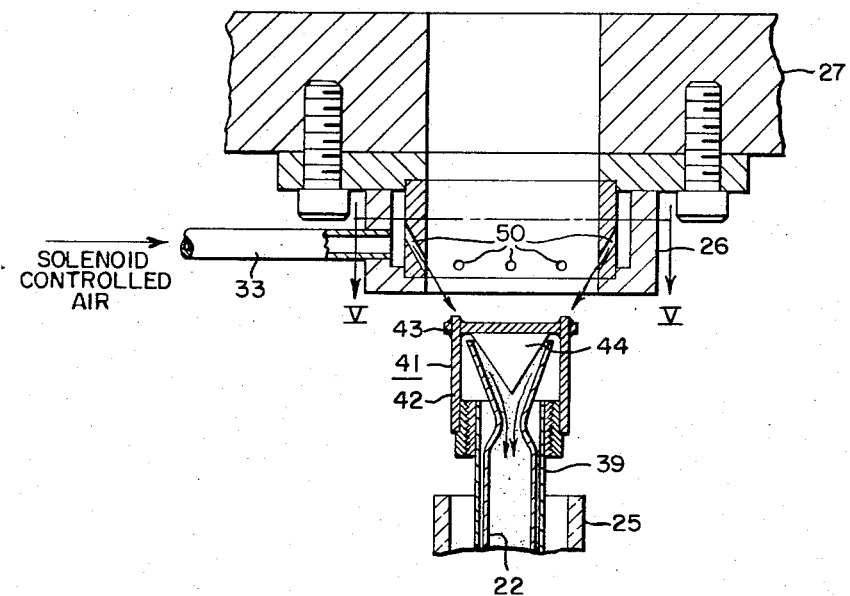
Figure 5:
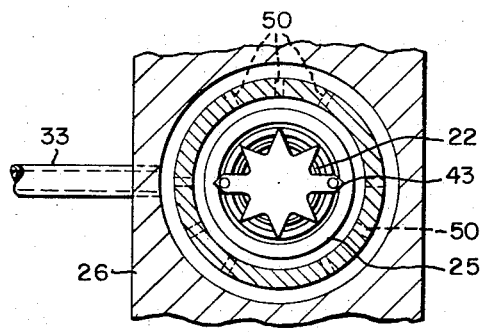

The present invention can be readily understood by reference to the accompanying drawings wherein:

FIG. 1 is a fragmentary sectional view of one side of the improved electrostatic coating apparatus of the present invention for the application of phosphor powder to the surface of an electric lamp envelope, FIG. 2 is a fragmentary elevational view in cross-section showing the radial dispersion of the air-suspended phosphor powder on to the interior surface of the envelope for a high pressure mercury vapor lamp, FIG. 3 is a sectional view taken on the line III—III of FIG. 2 and looking in the direction indicated by the arrows, FIG. 4 is an enlarged fragmentary sectional view of a portion of the apparatus shown in FIG. 1 and illustrating the blow-back position thereof, and FIG. 5 is a sectional view taken on the line V—V of FIG. 4 and looking in the direction indicated by the arrows.

Referring now to the drawings in detail the improved electrostatic coating apparatus as shown in FIG. 1 comprises a reservoir in the form of a plastic container 5 for housing the phosphor powder 6, with such reservoir threadedly engaging a cap 7 rigidly secured within the recess of a coupling 8, the latter of which is supported by toggles or the like 9 from a bracket 10 carried by a probe body 12. The lower end of the reservoir 5 is provided with a funnel 13 of plastic or other highly polished, non-abrading material having a curved bottom for directing the flow of the phosphor powder 6. Centrally disposed within the funnel 13 is a nozzle support assembly 14 also of a highly polished non-abrading material which is held in place by an alignment rod 15 and an air tube 16, both of which are suspended from the threaded cap 7 and the coupling 8. The air tube 16 communicates with a flexible conduit or hose 17 extending from a solenoid controlled air supply and the lower end of such tube 16 connects to a quartz or ceramic venturi nozzle 18 axially disposed on the nozzle support assembly 14 and hence coaxial with the reservoir 5.

A quartz venturi tube 19 is coaxially disposed relative to the nozzle 18 and is connected by a supporting coupling 20 to a quartz probe tube 22 which extends upwardly through the reservoir 5 to the exterior thereof passing through an opening in the cap 7 and supporting coupling 8. Between the latter and the bracket 10 the quartz probe tube 22 is provided with a coupling 23 of a suitable plastic, such as "Tygon" or the like, to allow separation of the quartz probe tube 22 when it is desired to remove the reservoir 5 and coupling 8 for any reason. The probe body 12 telescopically engages a cam operated non-metallic collar 24, such as "Lucite" or the like, which raises and lowers this probe body 12 along with the parts carried thereby such as the coupling 8 and hence the reservoir 5, the distance shown by the arrow extending from the full line position of the probe body 12 to its dotted line position as seen in FIG. 1. A quartz or "Pyrex" glass tube 25 is supported by the probe body 12 and extends upwardly through a ring-shaped air nozzle 26 secured to the underside of a fixed table 27 and through an opening therein into telescopic engagement with a rotatable metallic spindle 28, carrying a plastic extension 28a, and carried by an indexing turret 29 (FIG. 2) when the probe body 12 is in its raised position, as shown in FIG. 1. Rubber rings 31 prevent air leakage.

The probe body 12 is also provided with an angularly extending bore 30 communicating with the interior of the tube 25 and to which a flexible hose or the like 32 is connected that extends from a continuous vacuum exhaust system for a purpose hereinafter explained. The ring-shaped air nozzle 26 is also connected by a conduit 33 to a solenoid controlled air supply and extending downwardly from the fixed table 27 is a rod or the like 34 of suitable electrical insulating material which supports a depending metallic contact 35 connected by a conductor 36 to a high potential source of electrical power. Also, as seen in FIG. 1, the "Lucite" cam-operated collar 24 is provided with a spring-pressed contact 37 carried by a pair of cap screws or the like 38 so that the high potential electrical energy is transmitted to the probe body 12 and tube 25 when the contact 37 is in engagement with the depending contact 35.

The quartz probe tube 22 extends upwardly from its coupled juncture at the "Tygon" plastic coupling 23 and above the latter is surrounded by a coaxially disposed metallic tube 39 which is held in place within the probe body 12 by set screws 40. Thus both the metallic tube 39 with its encased quartz probe tube 22 pass through the probe body 12 and upwardly through the tube 25 until both the tube 39 and quartz probe tube 22 emerge from the latter and support a coating probe nozzle assembly 41. By reference now more particularly to FIGS. 2 and 3, it will be noted that the coating probe nozzle assembly 41 comprises the flared end of the quartz probe tube 22 and a nozzle support 42 threadedly attached to the end of the metallic tube 39.

A multiple probe tip 43, which as seen more clearly in FIGS. 3 and 5 simulates a star, is permanently affixed to the nozzle support 42 and on its under surface it has a quartz dispersing cone 44 secured thereto by suitable epoxy cement or the like. The spindle 28 (FIG. 2) is rotated by a belt-driven pulley 45 from a suitable source (not shown) below the turret 29 and the envelope 46 for an electric lamp, such as one for a high pressure mercury vapor lamp, fits tightly on such spindle 28 in coaxial alignment therewith. During rotation of the envelope 46 on the spindle 28 it is heated by a gas burner 47 over substantially its entire used surface, as shown in FIG. 2, to render the envelope surface conductive for the high potential energy supplied, since the burner 47 is connected by a conductor 48 to the other side of the high frequency supply source to complete the circuit thereto. During rotation of the turret 29 to index a spindle 28 with its coated lamp envelope 46 out of position, and movement of another uncoated envelope into the coating position of FIG. 2, the probe body 12 will be in its dotted-line position as seen in FIG. 1. The coating probe nozzle assembly 41 at this time will be completely withdrawn from the spindle 28, as well as from the ring-shaped air nozzle 26 carried by the underside of the table 27, and be at its rest position shown in FIG. 4.

Upon the spindle 28 with its uncoated envelope 46 stopping at the coating position of FIG. 2, the gas burner 47 immediately begins to heat such envelope and the operating cam (not shown) engages the collar 24 to raise the probe body 12 which carries with it the reservoir 5 as well as the coating probe nozzle assembly 41. As the reciprocating assembly moves upwardly to the point where the nozzle assembly 41 begins to emerge from the hollow spindle 28, the spring-pressed contact 37 engages the depending metallic contact 35 which thus closes the high frequency circuit through the probe body 12 and metallic tube 39 to create a high frequency field between the multiple probe tip 43 and the heated lamp envelope 46. Simultaneously, the solenoid valve (not shown) is opened to admit pressurized air through conduit 17 and air tube 16 which flows upwardly through the nozzle 18 into the quartz venturi tube 19 of the nozzle support assembly 14. This venturi action aspirates the fine phosphor powder 6 from the reservoir 5 and suspends it in the air stream where it is carried upwardly through the feed tube means or quartz probe tube 22. Such phosphor particles 6 then strike the quartz cone 44 and are directed substantially radially outward from the coating probe nozzle assembly 41 between the points of the star-shaped multiple probe tip 43, as shown by the arrows in FIG. 2.

The high potential electrostatic field then existing between the coating probe nozzle assembly 41 and the heated envelope 46 causes the charged phosphor particles 6 to be electrostatically deposited on the interior surface of such heated envelope. This deposition continues from the time that the reciprocating coating nozzle assembly 41 emerges from the upper end of the spindle 28 until it reaches the upper limit of its travel and again recedes below such spindle end. During this deposition the excess phosphor powder 6 is blown from the envelope 46 and passes downwardly through the tube 25 where it returns to a reclaiming receptacle aided by the continuous vacuum exhaust through the tube 32. The duration of the electrostatic deposition of the phosphor powder by the ionized field is controlled by the length of the depending metallic contact 35 which is sufficient to maintain engagement with the spring contact 37 during such reciprocatory movement of the probe head 12 and parts carried thereby.

Also, during this period the solenoid operated valve remains open to enable the flow of air through conduit 17 and air tube 16 but closes approximately simultaneously with separation of contacts 35 and 37. Shortly thereafter the probe body 12 will withdraw the coating probe nozzle assembly 41 completely from the spindle 28 as well as the ring-shaped air nozzle 24, as seen in FIG. 4. The withdrawal of the probe body 12 from the ring-shaped air nozzle 26 thus uncovers a plurality of angularly extending ports 50 and the solenoid controlled air supply through conduit 33 then blows off residual phosphor powder from the coating probe nozzle assembly, as shown by the arrows in FIG. 4, with such removed phosphor continuing to pass downwardly through the tube 25 and through the conduit or hose 32 by virtue of the continuous vacuum exhaust. The rate of the phosphor powder dispersion during actual coating is controlled by adjustment of the annular opening between the dispersing cone 44 and the flared end of the quartz probe tube 22 through rotation of the nozzle support 42 at its threaded connection with its supporting tube 39.

It should thus be apparent from the foregoing that an electrostatic coating apparatus has been herein shown and described in which the phosphor powder being dispersed passes through an ionized field generated by a multiple probe tip thus imparting a more uniform charging of all the phosphor particles and producing greater affinity to adhere to the envelope surface. Moreover, the use of quartz components in which air accelerated phosphor particles are in contact eliminates the previously existing contamination of the coating and particle size separation of the phosphor powder is also eliminated through complete utilization of the powder aspirated into the quartz venturi tube.

Although one specific embodiment of the present invention has been herein shown and described it is to be understood that still further modifications thereof may be made without departing from the spirit and scope of the invention.

We claim:

1. An electrostatic coating apparatus for coating finely divided phosphor onto the interior surface of an open-necked bulb, said apparatus comprising:
    (a) means for retaining and rotating said bulb in coating position;
    (b) heating means external to said bulb as retained in coating position for heating same;
    (c) a phosphor smoke generator comprising a phosphor powder reservoir operable to hold phosphor material to be coated, smoke-forming means operable to form phosphor powder in said reservoir into a powder smoke at a controlled rate and non-conducting and non-abrading feed tube means connecting to said smoke-forming means to receive and convey the phosphor smoke formed by said smoke-forming means;
    (d) probe means reciprocable into and out of said heated bulb when in coating position, said probe means comprising an extending metallic member which retains a non-conducting and non-abrading target member, said feed tube means terminating in an outlet spaced from the non-conducting target member of said probe means with powder smoke conducted through said feed tube means impinging against said target member, and a metallic conduit member positioned about said feed tube means and electrically connected to said extending metallic member of said probe means;

(e) high voltage supply means connecting to said metallic conduit member and to said heating means to generate an electrostatic field between the surface of said heated bulb and the extending metallic member of said probe means, and (f) an air nozzle positioned above the path of reciprocation of said probe means, said air nozzle operable to blow pressurized air over said probe means when said probe means is reciprocated from within said bulb.

2. An electrostatic coating apparatus for coating finely divided phosphor onto the interior surface of an open-necked bulb, said apparatus comprising:

(a) means for retaining and rotating said bulb in coating position;

(b) heating means external to said bulb as retained in coating position for heating same;

(c) a phosphor smoke generator comprising a phosphor powder reservoir operable to hold phosphor material to be coated, venturi means connecting to a gas supply to create a venturi action and positioned within the phosphor powder in said reservoir, said venturi means operable to form phosphor powder in said reservoir into a powder smoke at a controlled rate, and non-conducting and non-abrading feed tube means connecting to said venturi mean to receive and convey the phosphor smoke formed by said venturi means;

(d) probe means reciprocable into and out of said heated bulb when in coating position, said probe means comprising an extending metallic member which retains a non-conducting and non-abrading target member, said feed tube means terminating in an outlet contiguous with the non-conducting target member of said probe means with powder smoke conducted through said feed tube means impinging against said target member, and a metallic conduit member positioned about said feed tube means and electrically connected to said extending metallic member of said probe means;

(e) high voltage supply means connecting to said metallic conduit member and to said heating means to generate an electrostatic field between the surface of said heated bulb and the extending metallic member of said probe means;

(f) timing means for applying the high voltage potential from said high voltage supply means when phosphor smoke is introduced into said heated bulb, and (g) an air nozzle positioned above the path of reciprocation of said probe means, said air nozzle operable to blow pressurized air over said probe means when said probe means is reciprocated from within said bulb.

3. The apparatus as specified in claim 2, wherein said feed tube means is formed of vitreous material and said target means is formed of vitreous material.

4. The apparatus as specified in claim 2, wherein said smoke generator is rigidly affixed to said probe means.

5. An electrostatic coating apparatus for coating finely divided phosphor onto the interior surface of an open-necked bulb, said apparatus comprising:

(a) means for retaining and rotating said bulb in coating position;

(b) heating means external to said bulb as retained in coating position for heating same;

(c) a phosphor smoke generator comprising a non-metallic phosphor powder reservoir operable to hold phosphor material to be coated and having a downward tapering bottom, venturi means connecting to a gas supply to create a venturi action and positioned within said reservoir proximate the bottom thereof, said venturi means operable to form phosphor powder in said reservoir into a powder smoke at a controlled rate, and non-conducting and non-abrading feed tube means connecting to said venturi means to receive and convey the phosphor smoke formed by said venturi means;

(d) probe means reciprocable into and out of said heated bulb when in coating position, said probe means comprising an extending metallic member which retains a non-conducting and non-abrading target member, said feed tube means terminating in an outlet contiguous with the non-conducting target member of said probe means with powder smoke conducted through said feed tube means impinging against said target member, and a metallic conduit member positioned about said feed tube means and electrically connected to said extending metallic member of said probe means;

(e) high voltage supply means connecting to said metallic conduit member and to said heating means to generate an electrostatic field between the surface of said heated bulb and the extending metallic member of said probe means, and (f) an air nozzle positioned above the path of reciprocation of said probe means, said air nozzle operable to blow pressurized air over said probe means when said probe means is reciprocated from within said bulb.

References Cited

UNITED STATES PATENTS

| | | | |
|---|---|---|---|
| 2,770,503 | 11/1956 | Bourguet | 302—17 |
| 2,770,504 | 11/1956 | Bourguet | 302—53 |
| 2,806,444 | 9/1957 | Werner et al. | 118—49.1 |
| 2,811,131 | 10/1957 | Lopenksi et al. | 118—49.1 |
| 2,884,895 | 5/1959 | Lopenski et al. | 118—49.1 |
| 2,993,468 | 7/1961 | Zmuda et al. | 239—3 X |
| 2,995,463 | 8/1961 | Meister | 118—622 X |
| 3,125,457 | 3/1964 | Meister | 118—622 X |
| 3,248,606 | 4/1966 | Fraser | 239—15 X |
| 3,323,489 | 6/1967 | Gustin | 118—49.1 |

MORRIS KAPLAN, *Primary Examiner.*